No. 832,794. PATENTED OCT. 9, 1906.
J. A. JONES.
CASTER.
APPLICATION FILED SEPT. 29, 1905.

Witnesses:
H. L. Sprague
C. H. Seaholm

Inventor:
Josiah Albert Jones
By Chapin & Co
Attorneys.

THE NORRIS PETERS CO., WASHINGTON, D. C.

UNITED STATES PATENT OFFICE.

JOSIAH ALBERT JONES, OF BRISTOL, CONNECTICUT.

CASTER.

No. 832,794.     Specification of Letters Patent.     Patented Oct. 9, 1906.

Application filed September 29, 1905. Serial No. 280,687.

*To all whom it may concern:*

Be it known that I, JOSIAH ALBERT JONES, a citizen of the United States of America, residing at Bristol, in the county of Hartford and State of Connecticut, have invented new and useful Improvements in Casters, of which the following is a specification.

This invention relates to casters for furniture, the object of the invention being to provide an improved construction in that type of casters known as "ball-bearing;" and the invention consists in certain novel constructions and combination of parts to be fully described hereinafter and summarized in the claims appended hereto, the invention being fully illustrated in the accompanying drawings, in which—

Figure 1:
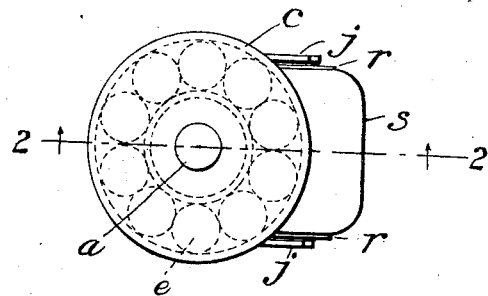
Figure 2:
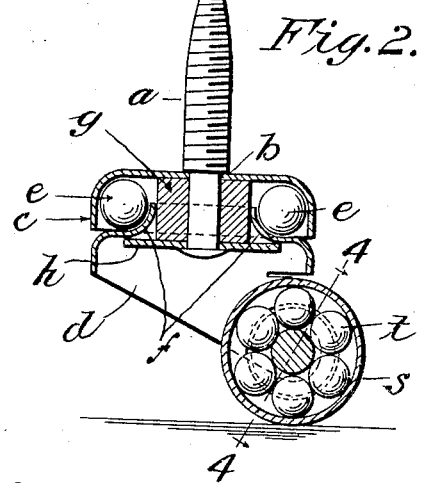
Figure 3:
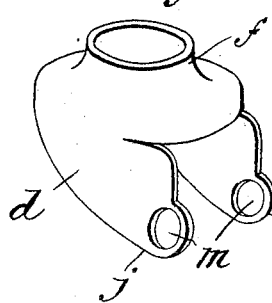
Figure 4:
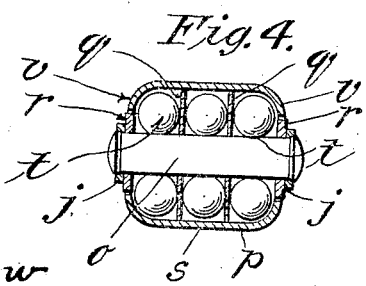
Figure 5:
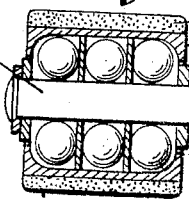

Figure 1 is a top plan view of a caster in which the invention is embodied. Fig. 2 is a sectional elevation on line 2 2, Fig. 1, and shows the method of assembling the parts. Fig. 3 is a perspective view of the swiveled wheel-bracket; and Fig. 4 is a longitudinal section through the wheel on line 4 4, Fig. 2, and shows the method of constructing said wheel and of securing balls in operative position on the shaft. Fig. 5 is a longitudinal section of a roll or wheel, showing a slight modification of the construction shown in Fig. 4.

Referring now to the drawings, $a$ indicates a spindle, preferably screw-threaded, as shown in Fig. 2, which is inserted in a hole in the leg of a chair, post of a bed, or whatever article the caster is to be applied to. The outer end of this spindle is turned down to form a shoulder $b$ thereon, and over this downturned portion is fitted a cup-shaped head $c$ in inverted position, as shown in Fig. 2, constituting a support for the wheel-bracket $d$. The interior rounded corner of this cup-shaped head $c$ serves as a ball-race for the steel balls $e$, the opposite seat for the balls being formed by the neck $f$ of the wheel-bracket $d$.

To hold the head $c$ in fixed position on the spindle, a sleeve $g$ is fitted over the turned-down end of the spindle after the head $c$ has been placed thereon, the balls $e$ then being placed in said head and the bracket $d$ slipped over the sleeve $g$, as shown in said Fig. 2, after which a washer $h$ is fitted over the turned-down end of the spindle and the latter headed down over the washer to tightly secure the head and the sleeve thereto, the washer $h$ being rigid enough to serve as a support for the bracket $d$ and hold it against movement in the direction of the axis of the spindle, the sleeve $g$ serving as a bearing around which the neck $f$ of said bracket may rotate.

Preferably the bracket $d$ (shown in perspective in Fig. 3) is made of a single piece of brass tubing, the neck $f$ being spun down on one end thereof and the two ears $j$ being cut out of the body of the tube and then bent outwardly to parallel position, as shown, by means of a suitable former. This, however, is only the preferred construction, and the cupped head $c$ and bracket may be made in any other way, if desired—as, for example, of malleable iron.

The ears $j$ of the bracket $d$ have holes $m$ punched therein to receive the shaft $o$ of the wheel $p$ (this letter indicating the latter as an entirety) and the ears $j$ being offset from the axis of the spindle to the end that in whatever position the article of furniture may be turned to which the caster is attached the wheel will trail, this, however, being a feature common to nearly all casters. In constructing the wheel the shaft $o$ has applied loosely thereon a number of washers $q$ between the ends of the shaft and also a washer $r$ near each end, the washers $q$ being loose on the shaft and having a diameter only slightly less than the interior diameter of the barrel $s$, whereas preferably the washers $r$ should fit the shaft closely and are of considerably less diameter than the interior of the barrel $s$. The spaces between these washers constitute ball-races for the balls $t$, and when they are all in position on the shaft the ends of the latter will extend far enough beyond the washers $r$ to receive the ears $j$ of the wheel-bracket, as shown in Fig. 4, the ends of the shaft being headed over slightly to secure the same in the bracket. In applying the barrel $s$ to the wheel the preferred way is to spin down one of the ends $v$ thereof, and one of the washers $r$ having been fitted to the shaft $o$ the spun-down end of the barrel is then slipped over the shaft and washer $r$ and the first row of the balls $t$ put in place. Then one of the washers $q$ is fitted over the shaft and another row of balls put in, followed by the second washer $q$ and washer $r$, the barrel then, by means of a suitable mechanical device, having its other end spun down at $v$, whereby seats are made for the outer rows of balls $t$, and at the same time the whole structure is, by the spinning down of the ends of the barrel, locked together on the shaft. While it is not essential that the washers $q$ should approximately fit the interior of the barrel, it is preferred to construct them as described, for being loose, as they are, on the shaft $o$ they will turn on the shaft with the balls $t$ should they contact with the interior of the barrel, and substantially fitting the latter, as they do, they support the barrel between its ends to a greater or less degree, thus rendering it possible to use lighter metal for the barrel than otherwise would be the case.

In Fig. 5 is shown a wheel of slightly-different construction from that shown in Fig. 4, in that the barrel thereof has a sleeve $w$ of rubber or like resilient material drawn over it to cushion it.

The construction of my roller as shown in Figs. 4 and 5 of the drawings is the form I preferably use, although I do not limit myself to this particular structure, the form shown being merely for the purpose of illustration, and I do not, therefore, make any claim on this particular form of roller.

Having thus described my invention, what I claim, and desire to secure by Letters Patent of the United States, is—

1. A caster comprising a spindle, a cup-shaped head secured thereto, a wheel-bracket having a necked-down portion extending into said head, bearing-balls being located between said head and the bracket, a sleeve on the end of the spindle which extends through the bracket to hold the same in operative spaced relation to the head and spindle, together with a wheel rotatably mounted in the bracket, and a washer for securing the parts together, as described.

2. A caster comprising a spindle, an inverted-cup-shaped head secured thereto, a wheel-bracket having a necked-down portion extending into said head, bearing-balls being located between the head and the bracket, and a sleeve secured to the end of the spindle which extends through the bracket to hold the same in operative spaced relation to the head and the spindle; a washer fitted on the lower end of the spindle and serving as a support for the bracket to hold the same against movement in the direction of movement of the axis of the spindle, as described.

JOSIAH ALBERT JONES.

Witnesses:
K. I. CLEMONS,
H. A. CHAPIN.